3,274,187
3-ALKOXY-4-[α(N-SUBSTITUTED-CARBAMYL)-ALKOXY]-BENZOIC ACID ESTERS
Rudolf Hiltmann, Hartmund Wollweber, Friedrich Hoffmeister, and Wolfgang Wirth, Wuppertal-Elberfeld, Germany, assignors to Farbenfabriken Bayer Aktiengesellschaft, Leverkusen, Germany, a corporation of Germany
No Drawing. Filed Dec. 19, 1962, Ser. No. 245,658
Claims priority, application Germany, Dec. 21, 1961, F 35,614
14 Claims. (Cl. 260—247.2)

This invention relates to new substituted 3,4-dihydroxy benzoic acid esters and to syntheses for the production thereof. More particularly, the invention involves the provision of novel 3-alkoxy-4-[(N-substituted-carbamyl)-alkoxy]-benzoic acid esters which possess valuable physiological utility by virtue of their unique efficacy as short-acting anaesthetics.

The invention is based, at least in part, on our discovery that the compounds of the general class defined, which shall be described in greater detail hereinafter, constitute a new type of intravenously-administrable anaesthetic which is physiologically functionable for a surprisingly short time and distinguished, in contrast to the conventional barbituric acid derivatives customarily employed for this purpose, by a very rapid subsidence of their anaesthetic effect and by the absence of any so-called "barbiturate hangover."

The novel compounds of the invention may be represented in general by the following structural formula:

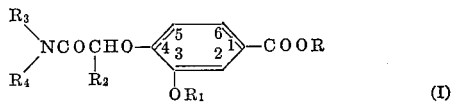

(I)

wherein R represents a saturated or unsaturated lower alkyl radical of straight or branched-chain configuration; $R_1$ represents a lower alkyl radical and preferably either a methyl or ethyl group; $R_2$ represents hydrogen, methyl or ethyl; $R_3$ represents hydrogen or a lower alkyl radical; and $R_4$ represents an alkoxy group or a lower alkyl radical; and wherein the substituents $R_3$ and $R_4$ may be joined with the nitrogen atom of the side chain in 4-position to form a heterocyclic radical including, for example, a pyrrolidino, piperidino, morpholino, 2-oxapyrrolidino or 2-oxapiperidino radical.

The novel compounds of the invention may be produced by several alternate syntheses. Thus, 3-alkoxy-4-hydroxy benzoic acid esters of the formula:

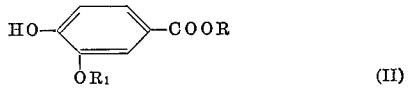

(II)

wherein R and $R_1$ have the same meaning as assigned above, can be reacted with reactive esters of N-substituted glycollic acid amides of the formula:

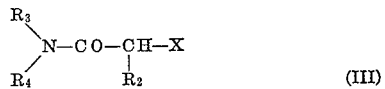

(III)

wherein $R_2$, $R_3$ and $R_4$ also have the same meaning as assigned above, and X denotes a reactive group such as halogen, alkylsulphonyl, or arylsulphonyl, and the like.

Alternatively, 3 - alkoxy - 4 - (α - carboxyalkoxy)-benzoic acid esters of the same general structure illustrated by Formula I above, but carrying a carboxylic acid grouping in lieu of the N-substituted carbamyl radical (NH₂CO—) at the terminal end of the side-chain in 4-position, or derivatives thereof which have been functionally modified in that carboxyl grouping, as, for example, esters, mixed anhydrides or acid halides, can be reacted with amines of the formula:

(IV)

wherein $R_3$ and $R_4$ again have the same meaning as assigned above, or with reactive derivatives of such amines such as the corresponding chlorocarbonic acid amides or ester amides of sulphurous acid.

Lastly, 3,4-dihydroxy benzoic acids of the formula:

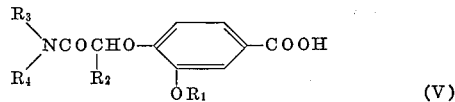

(V)

wherein $R_1$, $R_2$, $R_3$ and $R_4$ have the same meaning as assigned above, or reactive derivatives of such acids such as esters, acid chlorides, or mixed anhydrides or their salts, can be transformed into the corresponding desired esters by reacting the same with saturated or unsaturated straight or branched-chain aliphatic alcohols or their reactive esters, such as, for example, the halides.

To illustrate the unique pharmacological utility of the compounds of the invention, a typical compound, namely, the 3 - methoxy - 4 - [(N - ethyl - N - ethoxy - carbamyl)-methoxy]-benzoic acid n-propyl ester as produced in accordance with the procedures described in Example V presented hereinafter, was tested in comparative studies via intravenous administration in dogs with the well-known sodium salt of 5-methyl-5-cyclophenyl-N-methyl barbituric acid. The results of these studies are presented in tabulated form below:

TABLE

| | Product of Example V | Control Product |
|---|---|---|
| (A) Dose, mg./kg | 20 | 40 |
| (B) Anaesthesia Stage [1] | VI | VI |
| (C) Total Duration of Anaesthesia, minutes | 35 | 166 |
| (D) Duration of Anaesthesia from VI-IV as Percentage of Total Duration of Anaesthesia, percent | 50 | 17 |

[1] Anaesthesia stage VI corresponds, according to Magnus-Girndt, to deep anaesthesia with complete absence of reflexes (i.e., tolerance stage), whereas anaesthesia stage IV corresponds to lateral position maintaining corneal and pinch reflex. The time between anaesthesia stage VI and stage IV provides an approximate measure for the time available for surgical action.

As reference to the foregoing results demonstrates, it is apparent that a reduced dosage level of the compound of the invention is capable of achieving the same depth of anaesthesia as can be produced with the conventional control product only at higher dosage level, and that the total duration of anaesthesia is considerably shorter for the product of the invention than that produced by the control product. In the latter respect, the total duration of anaesthesia denotes the time interval between the setting in of anaesthesia and the disappearance of any anaesthetic symptoms, that is, the time at which the animal behaves in a completely normal manner. As applied to humans, this time period indicates or symbolizes the "street or ambulatory fitness" of the anaesthesized patient. Substantial similar results have been obtained in the same test procedures as applied to rabbits.

Significantly, the unique short-acting narcotic or soporific properties of the compounds of the invention lead to a much earlier street fitness than standard anaesthetic agents as, for example, the control agent identified above; this factor being of decisive importance in minor surgery where an anaesthesia of very short duration is required. Apart from the specific control product identified above, such short-acting anaesthetic properties, capable also of achieving the full tolerance stage required, have hitherto been unknown or unavailable in any intravenously administrable commercial form of anaesthetic.

It is believed that the invention may be best understood by reference to the following specific examples illustrating the application of the foregoing principles and procedures in the preparation of typical compounds of the invention.

*Example I*

Vanillic acid n-propyl ester (B.P. 128–130° C./0.4 mm. Hg), in amount of 46.5 grams, was added to a solution of 5.1 grams of sodium in 150 cubic centimeters of n-propanol. After driving out the propanol in vacuum, the residue in the flask was dissolved in 200 milliliters of dimethyl formamide. Sodium iodide, in amount of 0.5 gram, was added, and 15 grams of chloroacetic acid-N,N-diethyl amide were added in dropwise fashion to the solution. The mixture was heated to 130° C. with stirring, and the heating was continued until the alkaline reaction had disappeared (about 3–4 hours). From the reaction mixture thus produced, the precipitated salts were removed by suction filtration. After driving out the dimethyl formamide in vacuum by fractional distillation, 51.1 grams of the desired 3-methoxy-4-[(N,N-diethylcarbamyl)-methoxy]-benzoic acid n-propyl ester were obtained (boiling point 212–214° C./0.6 mm. Hg; melting point 63–63.5° C.—ethyl acetate/ligroin).

In an analogous manner, the compound, 3-methoxy-4-[(N,N-diethylcarbamyl)-methoxy]-benzoic acid ethyl ester (boiling point 213–216° C./1.25 mm. Hg) was produced from vanillic acid ethyl ester and chloroacetic acid-N,N-diethyl amide, and the compound, 3-methoxy-4-[(N,N-diethylcarbamyl)-methoxy]-benzoic acid methyl ester (boiling point 214–215° C./1.5 mm. Hg) was produced from vanillic acid methyl ester and chloroacetic acid-N,N-diethyl amide.

*Example II*

Vanillic acid n-propyl ester, in amount of 36 grams, was heated overnight under reflux with 37.3 grams of α-bromo-propionic acid-N,N-diethyl amide and 25.7 grams of potassium carbonate in 75 cubic centimeters of acetone. The resulting mixture was filtered off with suction, the filtrate taken up in ether, shaken with a cold 10 percent sodium hydroxide solution, and the ethereal solution was fractionated in vacuum. There were obtained 46 grams of the compound, 3-methoxy-4-[(N,N-diethylcarbamyl)-α-ethoxy]-benzoic acid n-propyl ester of boiling point 206–207° C./0.3 mm. Hg.

In an analogous manner, the compound, 3-methoxy-4-[(N,N-diethylcarbamyl)-α-propoxy]-benzoic acid n-propyl ester of boiling point 197–198° C./0.35 mm. Hg was obtained from vanillic acid n-propyl ester and α-bromobutyric acid-N,N-diethyl amide.

*Example III*

Vanillic acid n-propyl ester, in amount of 46.5 grams, was introduced into a solution of 5.1 grams of sodium in 150 milliliters of n-propanol. The solvent was evaporated in vacuum, the residue taken up in 200 cubic centimeters of dimethyl formamide, and the mixture was reacted, in accordance with the procedure described in Example I, with the equivalent quantity of chloroacetic acid-N-tert. butyl amide. The compound, 3-methoxy-4-[(N-tert. butylcarbamyl)-methoxy]-benzoic acid n-propyl ester of melting point 89–90° C. was obtained in a yield of 60.3 grams.

In an analogous manner, the compound, 3-methoxy-4-[(N-tert. butylcarbamyl)-methoxy]-benzoic acid ethyl ester of melting point 82–82.5° C. was produced from vanillic acid ethyl ester and α-chloroacetic acid-N-tert. butyl amide.

Similarly, the compound, 3-methoxy-4-[(N-tert. butylcarbamyl)-methoxy]-benzoic acid methyl ester of boiling point 199–201° C./1 mm. Hg was produced from vanillic acid methyl ester and α-chloroacetic acid-N-tert. butyl amide.

Also in an analogous manner, the compound, 3-methoxy-4-[(N-ethylcarbamyl)-methoxy]-benzoic acid n-propyl ester of melting point 70–72° C. was produced from vanillic acid n-propyl ester and α-chloroacetic acid-N-ethylamide.

*Example IV*

Vanillic acid n-propyl ester, in amount of 21 grams, was heated overnight under reflux with 18 grams of chloroacetic acid morpholide and 15 grams of potassium carbonate in 75 cubic centimeters of acetone. By the same working procedure as described in Example II, the compound, 3-methoxy-4-[(carbomorpholino)-methoxy]-benzoic acid n-propyl ester was produced (boiling point 236–238° C./0.4 mm. Hg; melting point 75–76° C.).

In an analogous manner, the compound, 3-methoxy-4-[(carbopiperidino)-α-ethoxy]-benzoic acid n-propyl ester boiling point 210–212° C./0.4 mm. Hg; melting point 94.5–96° C.) was obtained from vanillic acid n-propyl ester and α-bromopropionic acid piperidide.

*Example V*

Vanillic acid n-propyl ester, in amount of 80.5 grams, was heated under reflux with 68.8 grams of chloroacetic acid-N-ethoxy-N-ethyl amide and 62.6 grams of potassium carbonate in 167 cubic centimeters of acetone for 12 hours. By the same working procedure as described in Example II, the compound, 3-methoxy-4-[(N-ethoxy-N-ethyl-carbamyl)-methoxy]-benzoic acid n-propyl ester was obtained in a yield of 114 grams. The product has the boiling point 208–210° C./0.4 mm. Hg.

The chloroacetic acid-N-ethoxy-N-ethyl amide used as the starting material in this synthesis was obtained by reacting α-chloro-acetyl chloride with N,O-diethyl hydroxyl amine in the presence of potassium carbonate. It has the boiling point 80° C./0.5 mm. Hg.

*Example VI*

3-methoxy-4-carboxymethoxy-benzoic acid n-propyl ester, in amount of 26.8 grams, was dissolved in 256 cubic centimeters of benzene. One-half (0.5) milliliter of dimethyl formamide was added, and then 12.5 grams of thionyl chloride were added in dropwise fashion, and the mixture was heated for 2 hours to 80° C. Subsequently the solvent was evaporated in vacuum, the residue taken up in 200 milliliters of benzene and 18.5 grams of diethyl amine were added dropwise at 20° C. The mixture was heated for one hour under reflux and the unreacted carboxylic acid was removed from the benzene solution by extraction with sodium carbonate solution. After drying over sodium sulphate and distillation the compound, 3-methoxy-4-[(N,N-diethylcarbamyl)-methoxy]-benzoic acid n-propyl ester was obtained in a yield of 22.6 grams (boiling point 210–212° C./0.25 mm. Hg).

The 3-methoxy-4-carboxymethoxy-benzoic acid n-propyl ester used as the starting material in this synthesis, was obtained in a yield of 42.1 grams by reacting 42 grams of vanillic acid n-propyl ester with 25.6 grams of chloroacetic acid sodium salt in the presence of a solution of 4.6 grams of sodium in 200 milliliters of n-propanol. It has the melting point 69–71° C.

*Example VII*

The 3-methoxy-4-[(N,N-diethylcarbamyl) - methoxy]-benzoic acid methyl ester of Example I, in amount of 60 grams, was dissolved in 300 milliliters of n-propanol and, after the addition of 0.2 gram of sodium propylate, the mixture was heated in an efficacious column until no more methanol distilled over. After driving out the excess of propyl alcohol, the mixture was distilled in vacuum, yielding 51 grams of the compound, 3-methoxy-4-[(N,N-diethylcarbamyl) - methoxy] - benzoic acid n- propyl ester of boiling point 212–214° C./0.6 mm. Hg.

In an analogous manner, by transesterifying the 3-methoxy-4-[(N,N-diethylcarbamyl) - methoxy] - benzoic acid methyl ester with allyl alcohol, there is produced the compound, 3-methoxy-4-[(N,N - diethylcarbamyl)-methoxy]-benzoic acid allyl ester of boiling point 206–210° C./0.1 mm. Hg.

*Example VIII*

Twenty-five (25) grams of 3-methoxy-4-[(N,N-diethylcarbamyl)-methoxy]-benzoic acid (melting point 118–119° C.), obtained from the methyl ester by saponification with alkali, were heated under reflux for 8 hours with 200 milliliters of n-propyl alcohol containing 3 percent hydrogen chloride. After driving out the solvent, the residue was taken up in benzene, washed with sodium carbonate and water, and then dried with sodium sulphate. After driving out the benzene, the residue was distilled in vacuum and 22 grams of the compound, 3-methoxy-4-[(N,N-diethylcarbamyl) - methoxy] - benzoic acid n-propyl ester were obtained (melting point 63–63.5° C.).

What is claimed is:

1. A chemical compound of the formula:

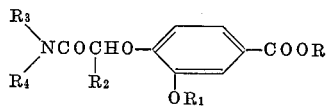

wherein R is lower alkyl; $R_1$ is selected from the group consisting of methyl and ethyl; $R_2$ is selected from the group of hydrogen, methyl and ethyl; $R_3$ is selected from the group consisting of hydrogen and lower alkyl; $R_4$ is lower alkyl; and $R_3$ and $R_4$ when joined with the nitrogen atom form a heterocyclic member selected from the group consisting of pyrrolidino, piperidino, morpholino, 2-oxopyrrolidino, and 2-oxopiperidino.

2. The chemical compound, 3-methoxy-4-[(N,N-diethyl-carbamyl)-methoxy]-benzoic acid n-propyl ester.

3. The chemical compound, 3-methoxy-4-[(N,N-diethyl-carbamyl)-methoxy]-benzoic acid ethyl ester.

4. The chemical compound, 3-methoxy-4-[(N,N-diethylcarbamyl)-methoxy]-benzoic acid methyl ester.

5. The chemical compound, 3-methoxy-4-[α-(N,N-diethylcarbamyl)-ethoxy]-benzoic acid n-propyl ester.

6. The chemical compound, 3-methoxy-4-[α-(N,N-diethylcarbamyl)-propoxy]-benzoic acid n-propyl ester.

7. The chemical compound, 3-methoxy-4-[(N-tert. butylcarbamyl)-methoxy]-benzoic acid n-propyl ester.

8. The chemical compound, 3-methoxy-4-[(N-tert. butylcarbamyl)-methoxy]-benzoic acid ethyl ester.

9. The chemical compound, 3-methoxy-4-[(N-tert. butylcarbamyl)-methoxy]-benzoic acid methyl ester.

10. The chemical compound, 3-methoxy-4-[(N-ethylcarbamyl)-methoxy]-benzoic acid n-propyl ester.

11. The chemical compound, 3-methoxy-4-[(carbomorpholino)-methoxy]-benzoic acid n-propyl ester.

12. The chemical compound, 3-methoxy-4-[α-(carbopiperidino)-ethoxy]-benzoic acid n-propyl ester.

13. The chemical compound, 3-methoxy-4-[(N-ethoxy-N-ethyl-carbamyl)-methoxy]-benzoic acid n-propyl ester.

14. The chemical compound, 3-methoxy-4-[(N,N-diethylcarbamyl)-methoxy]-benzoic acid allyl ester.

References Cited by the Examiner

UNITED STATES PATENTS

| | | | |
|---|---|---|---|
| 1,915,334 | 6/1933 | Salzberg et al. | 260—243 |
| 2,075,359 | 3/1937 | Salzberg et al. | 167—22 |
| 2,425,320 | 8/1947 | Hill | 252—149 |
| 2,606,155 | 8/1952 | Hill | 252—149 |
| 2,867,619 | 1/1959 | Biel | 260—247.2 |
| 2,868,689 | 1/1959 | Florestano et al. | 167—52 |
| 2,969,386 | 1/1961 | McElroy | 260—471 |
| 3,034,958 | 1/1962 | Millman | 167—52 |

ALEX MAZEL, *Primary Examiner.*

NICHOLAS S. RIZZO, HENRY R. JILES, *Examiners.*

J. TOVAR, *Assistant Examiner.*